(12) United States Patent
Kalló

(10) Patent No.: US 6,934,089 B1
(45) Date of Patent: Aug. 23, 2005

(54) OBJECTIVE LENS SYSTEM

(75) Inventor: Péter Kalló, Budapest (HU)

(73) Assignee: Guardware Systems Informatikai Kft., Budapest (HU)

( * ) Notice: Subject to any disclaimer, the term of this patent is extended or adjusted under 35 U.S.C. 154(b) by 0 days.

(21) Appl. No.: 09/869,617

(22) PCT Filed: Dec. 6, 1999

(86) PCT No.: PCT/HU99/00093

§ 371 (c)(1),
(2), (4) Date: Jan. 23, 2002

(87) PCT Pub. No.: WO01/31563

PCT Pub. Date: May 3, 2001

(30) Foreign Application Priority Data

Oct. 28, 1999 (HU) ................................. 9903937

(51) Int. Cl.[7] ........................ G02B 13/22; G02B 21/02; G02B 17/00
(52) U.S. Cl. ........................ 359/663; 359/661; 359/726
(58) Field of Search ..................... 359/663, 661, 359/726

(56) References Cited

U.S. PATENT DOCUMENTS

| 2,500,017 | A | | 3/1950 | Altman |
| 4,253,726 | A | * | 3/1981 | Taira ........................... 359/388 |
| 4,598,980 | A | * | 7/1986 | Doi et al. .................... 359/735 |
| 5,119,238 | A | * | 6/1992 | Igarashi ....................... 359/714 |
| 5,513,001 | A | | 4/1996 | Ohtomo et al. |
| 5,764,347 | A | | 6/1998 | Podmaniczky et al. |
| 5,900,993 | A | | 5/1999 | Betensky |
| 6,643,390 | B1 | * | 11/2003 | Clark et al. ................. 382/124 |

FOREIGN PATENT DOCUMENTS

| EP | 308 162 | 9/1988 |
| EP | 361 987 | 4/1990 |
| JP | 8334691 | 12/1996 |
| JP | 10269344 | 10/1998 |

* cited by examiner

*Primary Examiner*—Scott J. Sugarman
(74) *Attorney, Agent, or Firm*—Knobbe, Martens, Olson & Bear, LLP

(57) ABSTRACT

An objective lens system (2), particularly for a fingerprint reader apparatus, said lens system (2) comprising a first lens (8) formed as a condensing lens guiding light beams arriving from an object generally telecentrically, an aperture stop (9) having a centre (P) and being located in the vicinity of a focal point of the first lens (8), a correcting second lens (10) arranged between the first lens (8) and the aperture stop (9) and juxtaposed with the aperture stop (9), and a correcting third lens (11) formed as a condensing lens and arranged beside the aperture stop (9) opposite the second lens (10). According to the invention, the second lens (10) is a condensing lens with a spherical surface ($S_3$) facing the first lens (8), wherein the curvature centre of the surface ($S_3$) is at a distance shorter than 15% of the curvature radius of the surface ($S_3$) from the centre (P) of the aperture stop (9), and the aperture stop (9) is arranged at a distance shorter than 25% of the focal length of the first lens (8) from the focal point of the first lens (8).

30 Claims, 2 Drawing Sheets

OBJECTIVE LENS SYSTEM

TECHNICAL FIELD

The invention relates to an objective lens system, particularly for a fingerprint reader apparatus.

BACKGROUND ART

With the wide-spread application of identification on the basis of fingerprints, the requirements imposed on a fingerprint reader apparatus and especially on the objective lens system thereof are diverse. It is desired to produce such objectives simply and at a low cost. In addition, the optical image of the fingerprint should be projected by the objective lens system to the image detector with an image quality corresponding to the physical resolution of the image detector applied. From the aspect of low cost production, it is also desirable that the objective lens system allows simple adaptation to various print area sizes, the latter basically depending on the space limited by the size of the fingerprint reader apparatus and on the desired reliability of fingerprint identification.

In a fingerprint reader apparatus, a total-reflection prism well known per se is generally used for displaying the fingerprint as an object, while the imaging of the object is carried out by an objective lens system by means of telecentric, central or afocal ray path imaging.

For example, in EP 0 308 162 A2 a fingerprint imaging optical system is described. In this known system, the image of a fingerprint appearing on the print area having a size of 19 mm×19 mm is telecentrically projected to the image detector via a distortion reducing correcting prism, a lens system consisting of two aspherical lenses, and an aperture stop located after the lens system. Because of the arrangement used therein, the optical system requires a very long optical path, which would result in large overall dimensions. To avoid this, auxiliary mirrors are arranged in the ray path, to ensure a still acceptable size of the system. The image created by this optical system is of an acceptable quality with limited distortion, thanks to the compensation prism applied.

In U.S. Pat. No. 5,764,347 an optical imaging system is described, where light beams exiting from a total-reflection prism formed with a special light exit surface are imaged by an optical unit consisting of three or four spherical lenses to an image-surface arranged at a distance from the optical axis. In the imaging system, the print area has a size of 25 mm×25 mm. In this known optical imaging system, a central ray path imaging is applied and a relatively high quality imaging is achieved with moderate distortion. The special design of the prism and the special arrangement of optical elements, however, make this optical system expensive to produce.

In JP 8 334 691 a generally distortion-free afocal imaging is described, where the print area has a size of approximately 20 mm×30 mm, and the objective lens system consists of two pairs of spherical lenses and an aperture stop between them. This design is relatively costly due to its complexity. In the fingerprint reader apparatus described in JP 10 269 344, an objective lens system with a pinhole aperture stop is used, which results in a moderate image quality, and an objective lens system consisting of two lenses is utilised for afocal imaging. It is the common disadvantage of these optical systems that due to the application of afocal imaging, adversely large overall dimensions are necessitated.

In U.S. Pat. No. 5,900,993 optical systems for fingerprint reading are described, where the objective lens system comprises a first lens guiding light beams arriving from a print area telecentrically, an aperture stop with a relatively large diameter located in the focal point of the first lens and a correcting lens system consisting of lenses arranged at both sides of the aperture stop. This correcting lens system—in order to reduce imaging disadvantages resulting from the relatively large aperture stop—is formed in a relatively complex way. The correcting lens systems of the embodiments disclosed in the specification basically consist of one lens having at least one aspherical surface arranged at each side of the aperture stop, except for the embodiment depicted in FIG. 4, where lenses having exclusively spherical surfaces are used, but in which the correcting lens system consists of three lenses. The lens located on the side of the aperture stop facing the fist lens is a dispersing lens, which is used primarily for correcting field curvature caused by the other lenses. The telecentric imaging enables a relatively shorter optical path, but the use of aspherical lenses and the correcting lens system consisting of three lenses increase the production costs of these optical systems.

A further common disadvantage of the objective lens systems described above is that in the case of systems having various print area sizes, they do not make possible to provide a product range based on a uniform optical block and therefore manufactured at a relatively favourable price.

DISCLOSURE OF INVENTION

The object of the invention is to create an objective lens system, particularly for a fingerprint reader apparatus product range having various print area sizes, which eliminates the disadvantages described above, can be produced flexibly and at a low cost, and furthermore creates an image of a quality and distortion very close to the physical resolution of the image detector applied.

Therefore, the invention is an objective lens system, particularly for a fingerprint reader apparatus, said lens system comprising a first lens formed as a condensing lens guiding light beams arriving from an object generally telecentrically, an aperture stop having a centre and being located in the vicinity of a focal point of the first lens, a correcting second lens arranged between the first lens and the aperture stop and juxtaposed with the aperture stop, and a correcting third lens formed as a condensing lens and arranged beside the aperture stop opposite the second lens. According to the invention, the second lens is a condensing lens with a spherical surface facing the first lens, the curvature centre of the surface being at a distance shorter than 15% of the curvature radius of the surface from the centre of the aperture stop, and the aperture stop is arranged at a distance shorter than 25% of the focal length of the first lens from the focal point of the first lens.

As the correcting second lens is a condensing lens having a surface facing the first lens quasi-concentrically with the centre of the aperture stop, the imaging errors caused by this lens can be substantially decreased, because the light beams entering this surface and travelling towards the aperture stop are refracted in a small degree, only. This enables the use of lenses with spherical surfaces in the objective lens system. Due to the use of the correcting second and third lenses, which improve image quality, the imaging of the object will not be strictly telecentric, and so the first lens—contrary to the above known approaches—is a lens having a so-called quasi-telecentric ray path. Therefore, in order to achieve an optimal image quality under the given conditions, the aperture stop is not to be located in the focal point of the first lens, but depending on the optical components applied, in a ±25% range of the focal length of the first lens. In this manner, by designing an objective lens system according to the invention, a fingerprint can be imaged for example onto a CMOS image sensor with a negligible distortion and diffraction limited image quality, apart from the narrow area of print area corners which are practically not utilised.

According to a preferred embodiment of the invention, focal lengths $f_1$, $f_2$ and $f_3$ of the first, second and third lenses formed as condensing lenses satisfy the relation $f_1 > f_3 > f_2$.

A particularly advantageous embodiment of the objective lens system according to the invention is characterised in that the aperture stop, the second lens and the third lens are formed as a separate unit not dependent on the size of the object, and the first lens is formed as a matching lens having a focal length depending on the size of the object. This enables the objective lens system according to the invention to be used in a fingerprint reader apparatus family product range having different print area sizes. The separate unit formed independently of the different print area sizes as a uniform block decreases the production costs of the objective lens systems for a fingerprint reader apparatus family product range.

The objective lens system according to the invention can be produced at an even lower cost and in a more productive way, if the first lens is a plano-concave lens and the third lens is a convex-planar lens. The convex-planar lens in this context means a lens having—in the direction of the light beams—a convex first surface and a second planar surface. The second lens is preferably of a meniscus shape bending towards the aperture stop. The first plano-concave lens can be cemented to a light exit surface of the total-reflection prism used generally in a fingerprint reader apparatus, which simplifies mounting of the objective lens system.

It is especially advantageous if the first lens, the second lens and the third lens are formed with spherical surfaces. The objective lens system according to the invention enables the application of this type of lenses, which substantially reduces production costs of the objective lens system in the case of small batches as glass lenses can be used. At larger production batches, the use of plastic lenses is—despite of the significant costs of the mould—more cost efficient, because they can be produced at a lower cost. The plastic lenses can be formed with aspherical surfaces which are advantageous from the aspect of further improving image quality, but the objective lens system according to the invention already accomplishes the 8×8 μm resolution of CMOS image sensors preferably used in a fingerprint reader apparatus, and so the application of lenses with aspherical surfaces is not absolutely necessary.

At least one of the first, second and third lenses preferably consists of two lens parts cemented to each other, said two lens parts being made of materials having different dispersion.

If it is desirable to reduce the overall sizes of the objective lens system, in the largest air space of the objective lens system, which is between the first lens and the second lens, a mirror or prism diverting the light beams can be arranged.

The object to be imaged by the objective lens system according to the invention is preferably a print of a finger on a print area of a total-reflecting surface of a prism. In this case the first lens is preferably cemented to the light exit surface of the prism. A preferred embodiment of the objective lens system projects the image of the print appearing on the print area onto a CMOS image sensor.

BRIEF DESCRIPTION OF DRAWINGS

The invention will hereinafter be described on the basis of preferred embodiments depicted by the drawings, where.

BEST MODES FOR CARRYING OUT THE INVENTION

Figure 1:
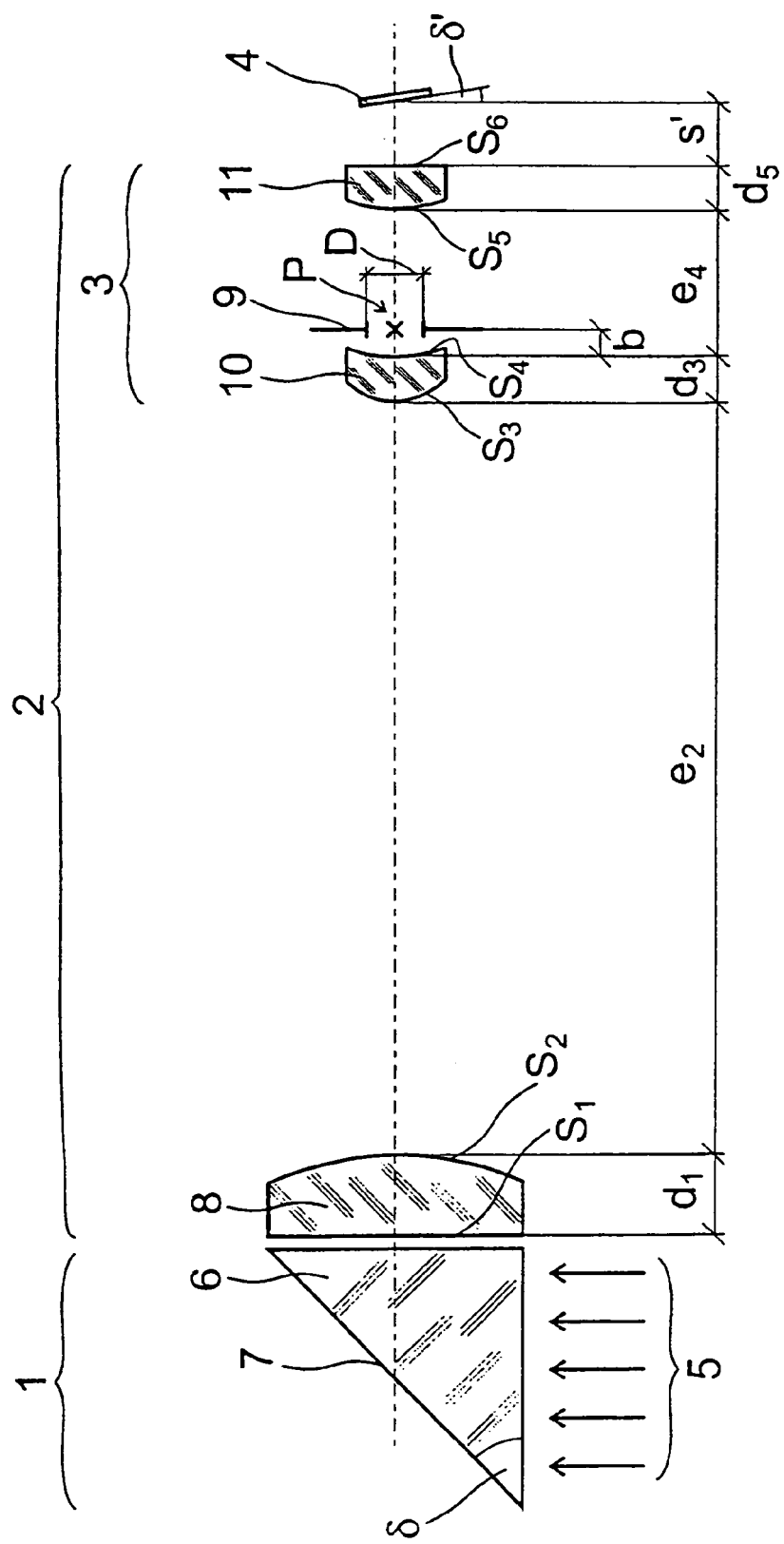
FIG. 1 is a schematical view of an objective lens system according to the invention for a fingerprint reader apparatus, together with a total-reflection prism and an image detector.

In FIG. 1, an objective lens system 2 arranged between a print imaging device 1 and a CMOS image sensor 4 is shown.

The print imaging device 1 comprises a prism 6 known per se, a total-reflecting surface of which represents a print area 7, on which a print of a finger in contact therewith appears. Through a light entering surface of prism 6, the print area 7 is illuminated with illumination 5 implemented preferably by one or more LED diodes, where the illumination has a narrow wavelength range, for example a 660 nm wavelength having a 20 to 40 nm half-width. At places where the finger is in contact with print area 7, the light of the illumination 5 is absorbed by the finger. From places, however, where the finger is not in contact with the print area 7, the light beams of the illumination 5 are totally reflected, they exit through the light exit surface of the prism 6, and by the objective lens system 2 according to the invention they are imaged onto image sensor 4. The prism 6 is made of a material having a refractive index $n_6$, and the print area 7 includes an angle δ with the optical axis shown as a dotted line.

Depending on the space limited by the size of the fingerprint reader apparatus and on the desired extent of fingerprint identification reliability, different sizes of print areas 7 can be applied. For example print area 7 can be of 20 mm×20 mm, 20 mm×25 mm or 25 mm×30 mm size, respectively, where the first figure is the width of print area 7.

The depicted preferred objective lens system 2 comprises a first lens 8 with a quasi-telecentric ray path and having a size and focal length depending on the size of the print area 7, wherein the aperture stop of the first lens 8 is an aperture stop 9 of the objective lens system 2 according to the invention. Furthermore, the objective lens system 2 includes a separate unit 3, in which the aperture stop 9 and at opposite sides thereof a correcting second and correcting third lenses 10 and 11 are arranged.

As mentioned above the first lens 8 with a quasi-telecentric ray path and a refractive index $n_1$ has a focal length $f_1$, which is selected depending on the size of the print area 7. Lens 8 is formed with a thickness $d_1$ and with spherical surfaces $S_1$ and $S_2$ having curvature radii $R_1$ and $R_2$, respectively. The light beams coming from the points of the print area 7, which are telecentric with a very good approximation, but not in the strictest sense, travel through lens 8, and exit from it in a quasi-telecentric way with a divergence of up to 3°. The first surface $S_1$ of the first lens 8 is preferably a spherical surface of infinite radius, i.e. a planar surface, and so it can be mounted by cementing to the light exit surface of prism 6. For three different print area sizes, Table 1 shows together with important features of the prism 6 possible embodiments of the first lens 8 having a quasi-telecentric ray path, as well as the size of an air space $e_2$ between lens 8 and the correcting second lens 10. It can be seen in the table that depending on the size of the print area 7, not only the focal length of the first lens 8, but the size of the air space $e_2$ must also be changed.

TABLE 1

| Size of print | Prism particulars | | Particulars of quasi-telecentric ray path lens and air space | | | | | |
|---|---|---|---|---|---|---|---|---|
| area (mm) | $n_6$ | $\delta$ (°) | $f_1$ (mm) | $n_1$ | $d_1$ (mm) | $R_1$ (mm) | $R_2$ (mm) | $e_2$ (mm) |
| 20 × 20 | 1.51 | 45 | 51.2 | 1.59 | 5 | ∞ | −30.20 | 47.9 |
| 20 × 25 | 1.51 | 45 | 58.5 | 1.59 | 5 | ∞ | −34.52 | 53.6 |
| 20 × 30 | 1.62* | 50* | 55.8 | 1.59 | 5 | ∞ | −32.90 | 62.6 |

*Values other than above ensure 500 dpi resolution

As described above, in the separate unit 3 of the objective lens system 2 according to the invention, the second and third lenses 10 and 11 and the aperture stop 9 between them are located. Due to the quasi-telecentric ray path according to the invention, the aperture stop 9 is not arranged in the focal point of the first lens 8, but at a distance from the focal point shorter than 25% of the focal length of the first lens 8. The second lens 10 is a meniscus-shaped condensing lens bending towards the aperture stop 9, and the third lens 11 is a condensing lens of convex-planar shape. Block 3 can be formed uniformly in a mechanically integrated way regardless of the size of various print area sizes. The meniscus shaped correcting lens 10 has a focal length $f_2$ and a refractive index $n_2$, and is formed with a thickness $d_3$ with spherical surfaces $S_3$ and $S_4$ having curvature radii $R_3$ and $R_4$, respectively. The curvature centre of surface $S_3$ of lens 10 is in the close vicinity of a centre P of the aperture stop 9; its distance from the centre P is shorter than 15% of the curvature radius of the surface $S_3$. In this way, surface $S_3$ facing the first lens 8 is quasi-concentric with the centre P of the aperture stop 9. By this design, the imaging errors caused by lens 10 can be minimised, because the light beams entering through the surface $S_3$ and travelling towards the aperture stop 9 are refracted in a small degree, only.

The aperture stop 9 having a diameter D is located at a distance b from the front point of the rear surface $S_4$ of lens 10. With the aperture stop 9 in-between, the lens 10 is separated by an air space $e_4$ from the correcting third lens 11 of convex-planar shape. Lens 11 has a focal length $f_3$ and a refractive index $n_3$ and is formed with a thickness $d_5$ with spherical surfaces $S_5$ and $S_6$ having curvature radii of $R_5$ and $R_6$, respectively. The value of radius $R_6$ is preferably infinite, i.e. the rear surface $S_6$ of lens 11 is a planar surface. From the rear surface $S_6$ of lens 11, a detector surface of the CMOS image sensor 4 including an angle $\delta'$ with a plane normal to the optical axis is at a distance s' measured along the optical axis.

It is known to the art that angle $\delta$ of the prism 6 and angle $\delta'$ of the detector surface of the CMOS image sensor 4 must be selected in a way that the planes obtained by extending the print area 7 and the detector surface practically intersect each other in the plane of the aperture stop 9. In this way the quality of the image obtained by the imaging of the print area 7 is optimal. In the depicted embodiment $\delta \approx 45°$ and $\delta' \approx 6 \ldots 9°$.

In the objective lens system 2 comprising condensing lenses, according to a preferred embodiment of the invention, the focal length $f_1$ of the first lens 8 having a quasi-telecentric ray path, the focal length $f_2$ of the correcting second lens 10 and the focal length $f_3$ of the correcting third lens 11 satisfy the relation $f_1 > f_3 > f_2$.

Two possible embodiments of the separate unit 3 formed in an identical way as a uniform block regardless of different print area sizes in the objective lens system 2 according to the invention are characterised by the structural particulars shown in Table 2.

TABLE 2

| | $f_2$ | $n_2$ | $d_3$ | $R_3$ | $R_4$ | b | D | $e_4$ | $f_3$ | $n_3$ | $d_5$ | $R_5$ | $R_6$ |
|---|---|---|---|---|---|---|---|---|---|---|---|---|---|
| I. | 13.3 | 1.59 | 3.14 | 5.32 | 12.88 | 1.54 | 1.4 | 7.73 | 26.6 | 1.59 | 1.94 | 15.56 | ∞ |
| II. | 13.0 | 1.59 | 3.51 | 5.01 | 10.63 | 1.08 | 1.4 | 6.67 | 23.3 | 1.59 | 2.0 | 13.75 | ∞ |

All data other than refractive indexes are shown in mm.

The three embodiments shown in Table 1 corresponding to three different print area sizes can be combined for example with embodiment I. of the separate unit 3 shown in Table 2. In the three embodiments of the objective lens system 2 according to the invention resulting from this combinations the aperture stop 9 is not in the focal point of the first lens 8, but at a distance shorter than 25% of the focal length $f_1$ of the lens 8 from its focal point. For these three embodiments it is valid furthermore, that the curvature centre of surface $S_3$ is at a distance shorter than 15% of the curvature radius of surface $S_3$ from the centre P of the aperture stop 9. In Table 3, the deviations of the place of the aperture stop 9 from the focal point of lens 8 and those of the place of the curvature centre of surface $S_3$ from the centre P of aperture stop 9 are shown in the percentage of the focal length $f_1$ of the first lens 8 and the curvature radius of the surface $S_3$, respectively.

TABLE 3

| Print area size (mm) | Separate unit | Deviation of place of aperture stop 9 | Deviation of place of curvature centre of surface $S_3$ |
|---|---|---|---|
| 20 × 20 | I. | 2.70% | 12.03% |
| 20 × 25 | | 0.38% | |
| 20 × 30 | | 20.57% | |

The identical refractive index values of the lenses shown in Tables 1 and 2 ensure that lenses 8, 10 and 11 of the objective lens system 2 according to the invention can be made in an interchangeable way from optical glass of n=1.59 refractive index, for example from optical glass SK5 made by SCHOTT, from polystyrene widely used for producing lenses and having the same refractive index or in the case of a broader wavelength-range illumination 5 in a cemented design made of lens parts being of materials having different dispersion and ensuring also colour correction of imaging.

By designing embodiments in which lenses 8, 10 and 11, particularly the correcting second and third lenses 10 and 11 integrated in the separate unit 3 have aspherical surfaces, the diameter of the numerical aperture can be increased, and in this way the image quality can be further improved. The application of aspherical surfaces can be justified by market-appearance and use of CMOS image sensors of a smaller pixel size. If in the fingerprint reader apparatus a CCD image detector is applied which has a resolution of 4 to 5 $\mu$m, it could also be useful to install lenses with aspherical surfaces into the objective lens system according to the invention. However, the use of CCD image detectors necessitates installation of many additional electronic components, which increases production costs.

Figure 2:
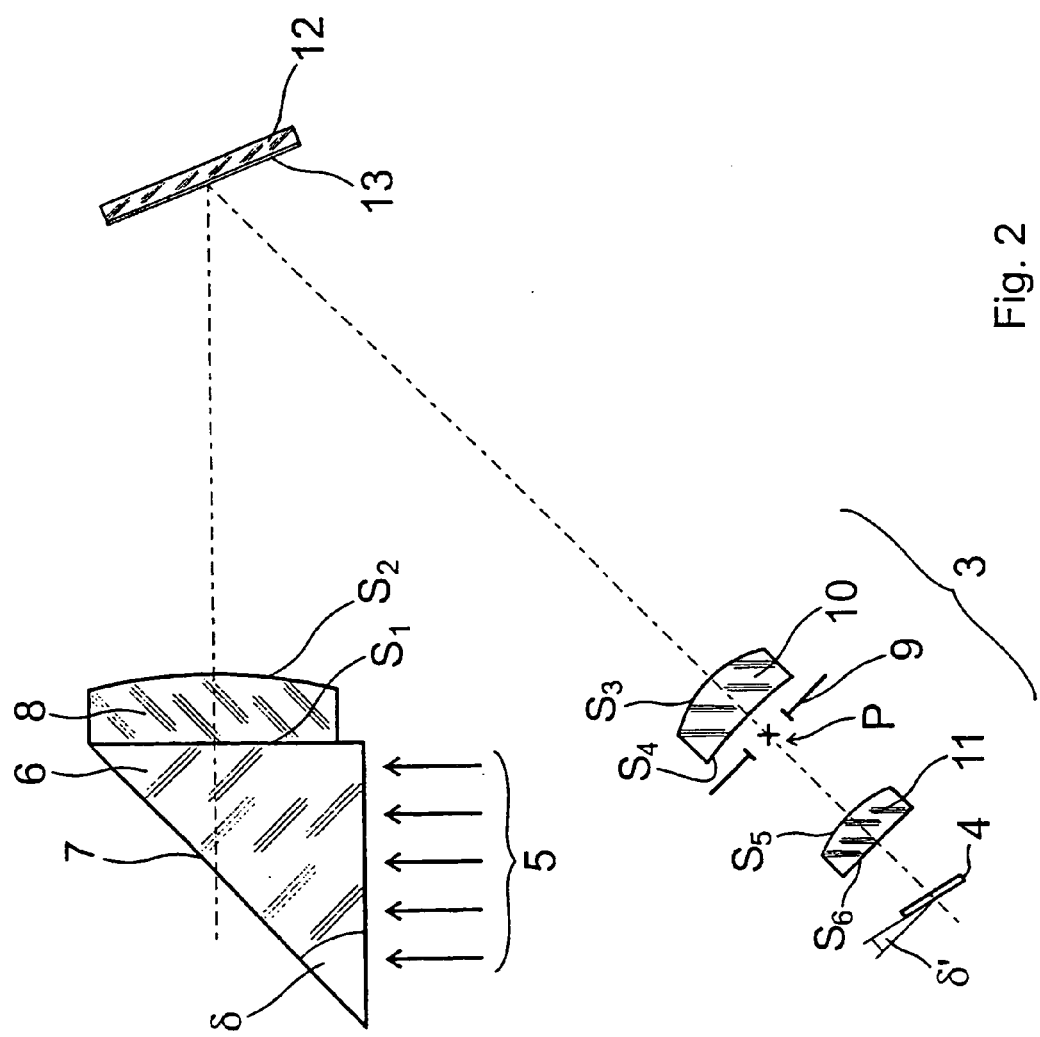
FIG. 2 shows another embodiment of the objective lens system according to the invention, where in the largest air space of the objective lens system a mirror diverting the light beams is arranged.

In the air space $e_2$ specified in the last column of Table 1, if necessary, a mirror or prism diverting the light beams can be inserted. Such an embodiment is depicted in FIG. 2, where a glass sheet 12 having a reflective surface formed by an aluminium layer 13 is arranged in the air space $e_2$ in a manner that the light beams projected in a quasi-telecentric way by the first lens 8 are reflected by the reflective surface of the aluminium layer 13, and they are imaged to the CMOS image sensor 4 by the separate unit 3 arranged below the prism 6 as shown in FIG. 2. By this design, the overall dimensions of the objective lens system 2 according to the invention can be modified or reduced, respectively, as required. Optionally, if it is desirable from the aspect of the mechanical design of the fingerprint reader apparatus, more than one mirror or prism diverting the light beams can be arranged in the air space $e_2$. In the embodiment depicted in FIG. 2, the first lens 8 is cemented with its planar surface $S_1$ to the light exit surface of the prism 6.

The objective lens system according to the invention can be used particularly preferably for producing a fingerprint reader apparatus family product range having different sized print areas, because in each type of the apparatus, only the first lens with a quasi-telecentric ray path must be matched with the size of the print area, and the separate unit can remain unchanged. Thereby, a low cost production can be achieved. It is a further advantage that all the three spherical lenses of the objective lens system according to the invention may be produced either from glass or plastic, depending on the production batch, and an additional cost saving feature is represented by the first and last planar surfaces of the objective lens system, through which it becomes possible to cement the lens with a quasi-telecentric ray path to the prism, thereby simplifying the mounting process.

Using the objective lens system according to the invention, apart from the narrow area of print area corners which are practically not utilised, a diffraction limited image can be created on the CMOS image sensor with a distortion of not higher than 1% and providing a spatial information density of 500 dpi, corresponding to a numerical aperture of NA=0.07. All this is achieved in a way that not too strict production and mounting tolerances are to be complied with, only, enabling cost efficient production of the objective lens system.

The objective lens system according to the invention may not only be used in a fingerprint reader apparatus, but in all systems where imaging of an object onto a planar surface is required with high accuracy. Such an apparatus can be, for example, a profile projector used in material machining operations, where the profile of an object to be machined is projected onto a screen. The screen-assisted control of the material machining tool enables a more accurate shaping of the profile. In this case, of course, the screen is located at a larger distance from the objective lens system than the image sensor used in the fingerprint reader apparatus.

It will be evident to those skilled in the art that the above disclosure is exemplary only and that various other alternatives, adaptations and modifications may be made within the scope of the present invention as defined by the following claims.

What is claimed is:

1. An objective lens system receiving light beams arriving generally telecentrically from an object, the objective lens system comprising:
   a first lens formed as a condensing lens, the first lens having a focal point and a focal length and receiving and guiding the light beams;
   an aperture stop having a center and positioned in the vicinity of the focal point of the first lens;
   a correcting second lens arranged between the first lens and the aperture stop and juxtaposed with the aperture stop wherein the second lens comprises a condensing lens with a spherical surface $S_3$ facing the first lens and wherein the spherical surface $S_3$ defines a curvature center and a curvature radius; and
   a correcting third lens formed as a condensing lens and arranged beside the aperture stop opposite the second lens wherein the curvature center of the spherical surface of the second lens is at a distance shorter than 15% of the curvature radius of the spherical surface of the second lens from the center of the aperture stop and wherein the aperture stop is arranged at a distance shorter than 25% of the focal length of the first lens from the focal point of the first lens.

2. The objective lens system of claim 1, wherein focal lengths $f_1$, $f_2$, and $f_3$ of the first, second, and third lenses respectively satisfy the relation $f_1 > f_3 > f_2$.

3. The objective lens system of claim 1, wherein the aperture stop, the second lens, and the third lens are formed as a separate unit and are not dependent on the size of the object and wherein the first lens is formed as a matching lens wherein the focal length of the first lens depends on the size of the object.

4. The objective lens system of claim 1, wherein the first lens is a plano-concave lens, the third lens is a convex-planar lens, and the second lens is of a meniscus shape bending towards the aperture stop.

5. The objective lens system of claim 1, wherein the first lens, the second lens, and the third lens are formed with spherical surfaces $S_1$, $S_2$, $S_3$, $S_4$, $S_5$, and $S_6$.

6. The objective lens system of claim 1, wherein the first lens, the second lens, and the third lens have at least one aspherical surface.

7. The objective lens system of claim 1, wherein at least one of the first, second, and third lenses comprise glass.

8. The objective lens system of claim 1, wherein at least one of the first second, and third lenses comprise plastic.

9. The objective lens system of claim 1, wherein at least one of the first, second, and third lenses comprise a plurality of separate lens parts wherein the lens parts are affixed together and wherein the lens parts comprise materials with different indices of refraction.

10. The objective lens system of claim 1, further comprising an air space interposed between the first and second lenses and a first light reflecting structure diverting the light beams wherein the first light reflecting structure is arranged in the air space.

11. The objective lens system of claim 10, further comprising a second light reflecting structure having a reflecting surface and a light exiting surface and wherein the object comprises a print of a finger positioned on the second reflecting structure so as to define a print area.

12. The objective lens system of claim 11, wherein at least one of the first and second light reflecting structures comprises a prism.

13. The objective lens system of claim 11, wherein the first lens comprises a plano-concave lens and wherein the first lens is affixed to the light exiting surface of the second light reflecting structure.

14. The objective lens system of claim 11, further comprising an image sensor wherein the print is projected onto the image sensor.

15. The objective lens system of claim 14, wherein the image sensor comprises a CMOS image sensor.

16. An imaging device including an objective lens system receiving light beams arriving generally telecentrically from an object, the objective lens system comprising:
 a first lens formed as a condensing lens, the first lens having a focal point and a focal length and receiving and guiding the light beams;
 an aperture stop having a center and positioned in the vicinity of the focal point of the first lens;
 a correcting second lens arranged between the first lens and the aperture stop and juxtaposed with the aperture stop wherein the second lens comprises a condensing lens with a spherical surface $S_3$ facing the first lens and wherein the spherical surface $S_3$ defines a curvature center and a curvature radius; and
 a correcting third lens formed as a condensing lens and arranged beside the aperture stop opposite the second lens wherein the curvature center of the spherical surface of the second lens is at a distance shorter than 15% of the curvature radius of the spherical surface of the second lens from the center of the aperture stop and wherein the aperture stop is arranged at a distance shorter than 25% of the focal length of the first lens from the focal point of the first lens.

17. The imaging device of claim 16, wherein focal lengths $f_1$, $f_2$, and $f_3$ of the first, second, and third lenses respectively satisfy the relation $f_1 > f_3 > f_2$.

18. The imaging device of claim 16, wherein the aperture stop, the second lens, and the third lens are formed as a separate unit and are not dependent on the size of the object and wherein the first lens is formed as a matching lens wherein the focal length of the first lens depends on the size of the object.

19. The imaging device of claim 16, wherein the first lens is a plano-concave lens, the third lens is a convex-planar lens, and the second lens is of a meniscus shape bending towards the aperture stop.

20. The imaging device of claim 16, wherein the first lens, the second lens, and the third lens are formed with spherical surfaces $S_1$, $S_2$, $S_3$, $S_4$, $S_5$, and $S_6$.

21. The imaging device of claim 16, wherein the first lens, the second lens, and the third lens have at least one aspherical surface.

22. The imaging device of claim 16, wherein at least one of the first, second, and third lenses comprise glass.

23. The imaging device of claim 16, wherein at least one of the first second, and third lenses comprise plastic.

24. The imaging device of claim 16, wherein at least one of the first, second, and third lenses comprise a plurality of separate lens parts wherein the lens parts are affixed together and wherein the lens parts comprise materials with different indices of refraction.

25. The imaging device of claim 16, further comprising an air space interposed between the first and second lenses and a first light reflecting structure diverting the light beams wherein the first light reflecting structure is arranged in the air space.

26. The imaging device of claim 25, further comprising a second light reflecting structure having a reflecting surface and a light exiting surface and wherein the object comprises a print of a finger positioned on the second reflecting structure so as to define a print area.

27. The imaging device of claim 25, wherein at least one of the first and second light reflecting structures comprises a prism.

28. The imaging device of claim 26, wherein the first lens comprises a plano-concave lens and wherein the first lens is affixed to the light exiting surface of the second light reflecting structure.

29. The imaging device of claim 26, further comprising an image sensor wherein the print is projected onto the image sensor.

30. The imaging device of claim 29, wherein the image sensor comprises a CMOS image sensor.

\* \* \* \* \*